United States Patent
Hotta et al.

[11] Patent Number: 5,452,114
[45] Date of Patent: Sep. 19, 1995

[54] FERROELECTRIC LIQUID CRYSTAL DEVICE WITH GROOVES BETWEEN ELECTRODE ON ONE SUBSTRATE, RIDGES ON THE OTHER

[75] Inventors: Yoshio Hotta; Yukio Hanyu, both of Atsugi; Tadashi Mihara, Isehara; Yasuto Kodera, Fujisawa; Katsutoshi Nakamura, Atsugi, all of Japan

[73] Assignee: Canon Kabushiki Kaisha, Tokyo, Japan

[21] Appl. No.: 944,076

[22] Filed: Sep. 11, 1992

[30] Foreign Application Priority Data

Sep. 13, 1991 [JP] Japan .................. 3-261353
Jan. 7, 1992 [JP] Japan .................. 4-018195
Jan. 24, 1992 [JP] Japan .................. 4-032863
Jan. 24, 1992 [JP] Japan .................. 4-032864

[51] Int. Cl.6 .................. G02F 1/1337; G02F 1/1333
[52] U.S. Cl. ........................ 359/75; 359/78; 359/82; 359/100
[58] Field of Search .............. 359/81, 82, 100, 54, 359/56, 87, 95, 75, 78

[56] References Cited

U.S. PATENT DOCUMENTS

| | | | |
|---|---|---|---|
| 4,569,574 | 2/1986 | Masaki et al. | 350/334 |
| 4,763,995 | 8/1988 | Katagiri et al. | 359/81 |
| 4,824,213 | 4/1989 | Morokawa | 359/67 |
| 4,898,456 | 2/1990 | Okada et al. | 359/56 |
| 4,906,072 | 3/1990 | Kareho et al. | 359/87 |
| 5,007,716 | 4/1991 | Hanyu et al. | 350/336 |
| 5,138,473 | 8/1992 | Dijou et al. | 359/100 |
| 5,189,536 | 2/1993 | Hanyu et al. | 359/100 |
| 5,305,131 | 5/1994 | Terada et al. | 359/100 |

Primary Examiner—William L. Sikes
Assistant Examiner—Kenneth Parker
Attorney, Agent, or Firm—Fitzpatrick, Cella, Harper & Scinto

[57] ABSTRACT

A ferroelectric liquid crystal display device is formed by a first substrate having thereon elongated transparent electrodes constituting data electrodes, a second substrate having thereon elongated transparent electrodes constituting scanning electrodes, and a ferroelectric liquid crystal disposed between the first and second substrates. At least one of the first and second substrates has minute stripe elevation in parallel with the longitudinal direction of the elongated transparent electrodes on each of the elongated transparent electrodes, whereby a liquid crystal molecular movement causing a deterioration in display quality is suppressed.

16 Claims, 13 Drawing Sheets

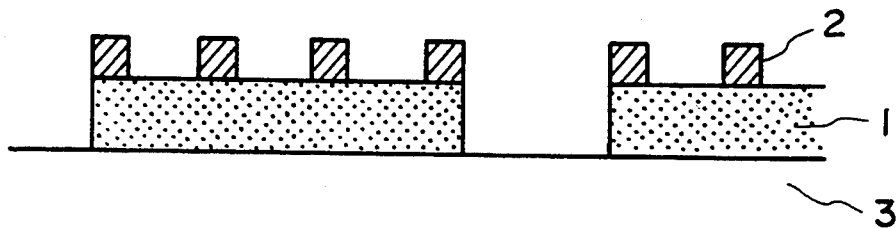
F I G. 1
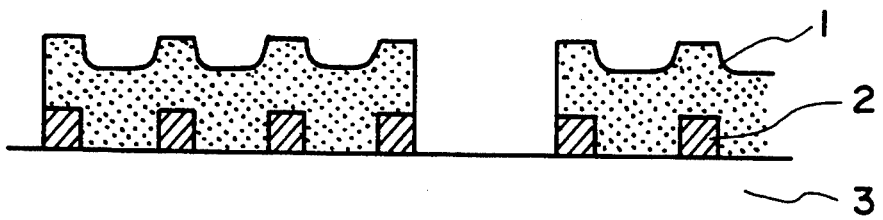
F I G. 2
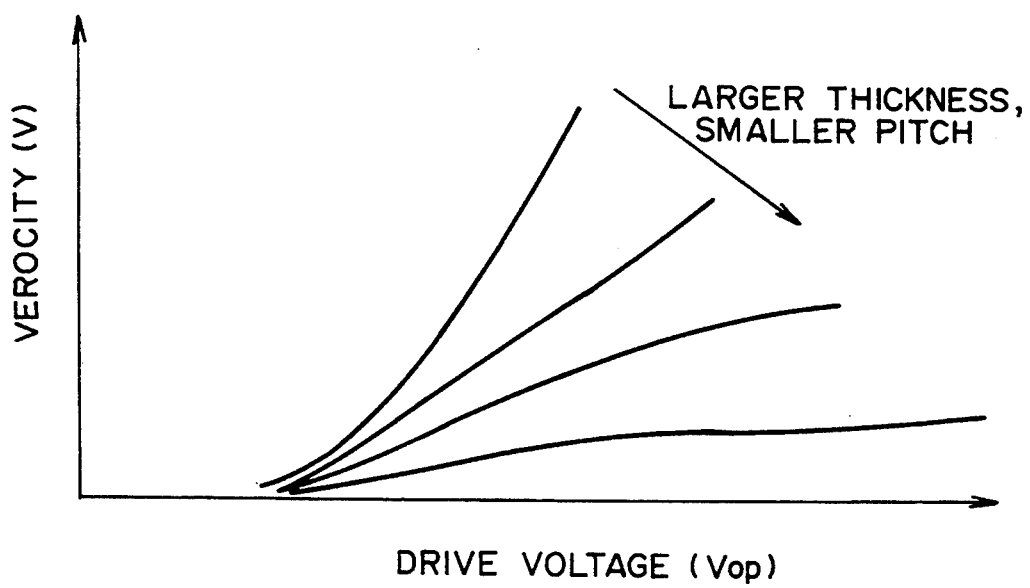
F I G. 3

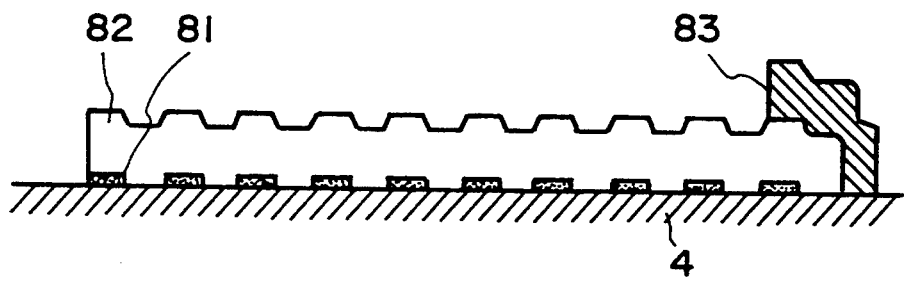
FIG. 8A
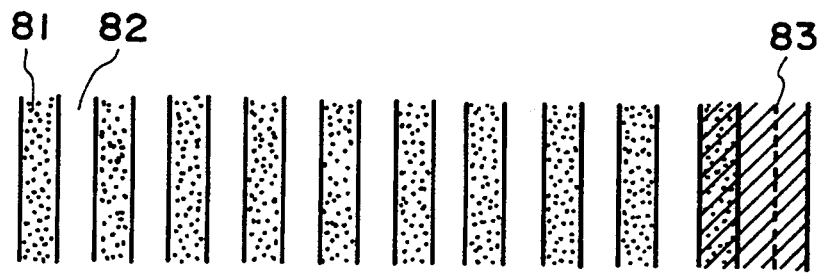
FIG. 8B
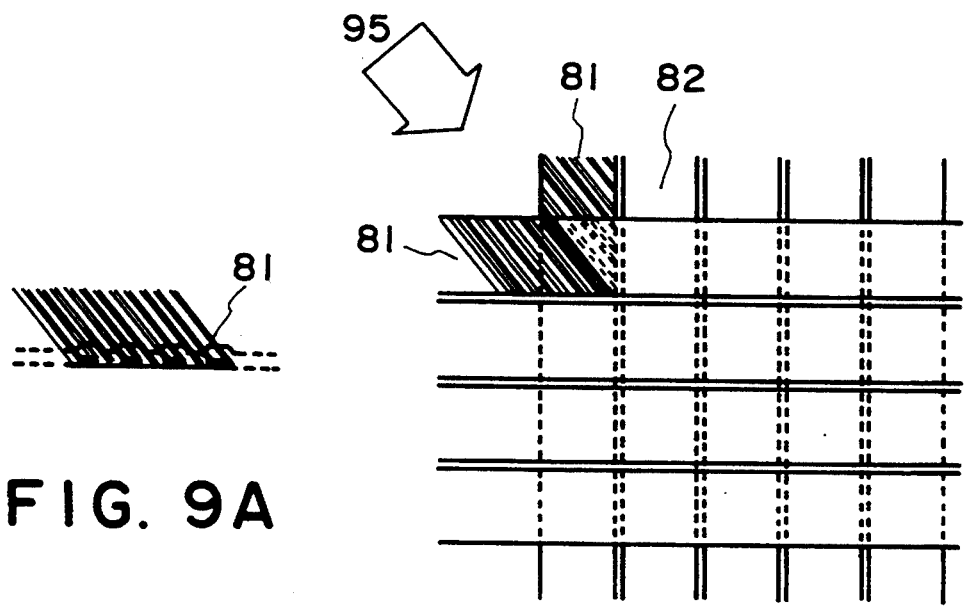
FIG. 9A
FIG. 9B

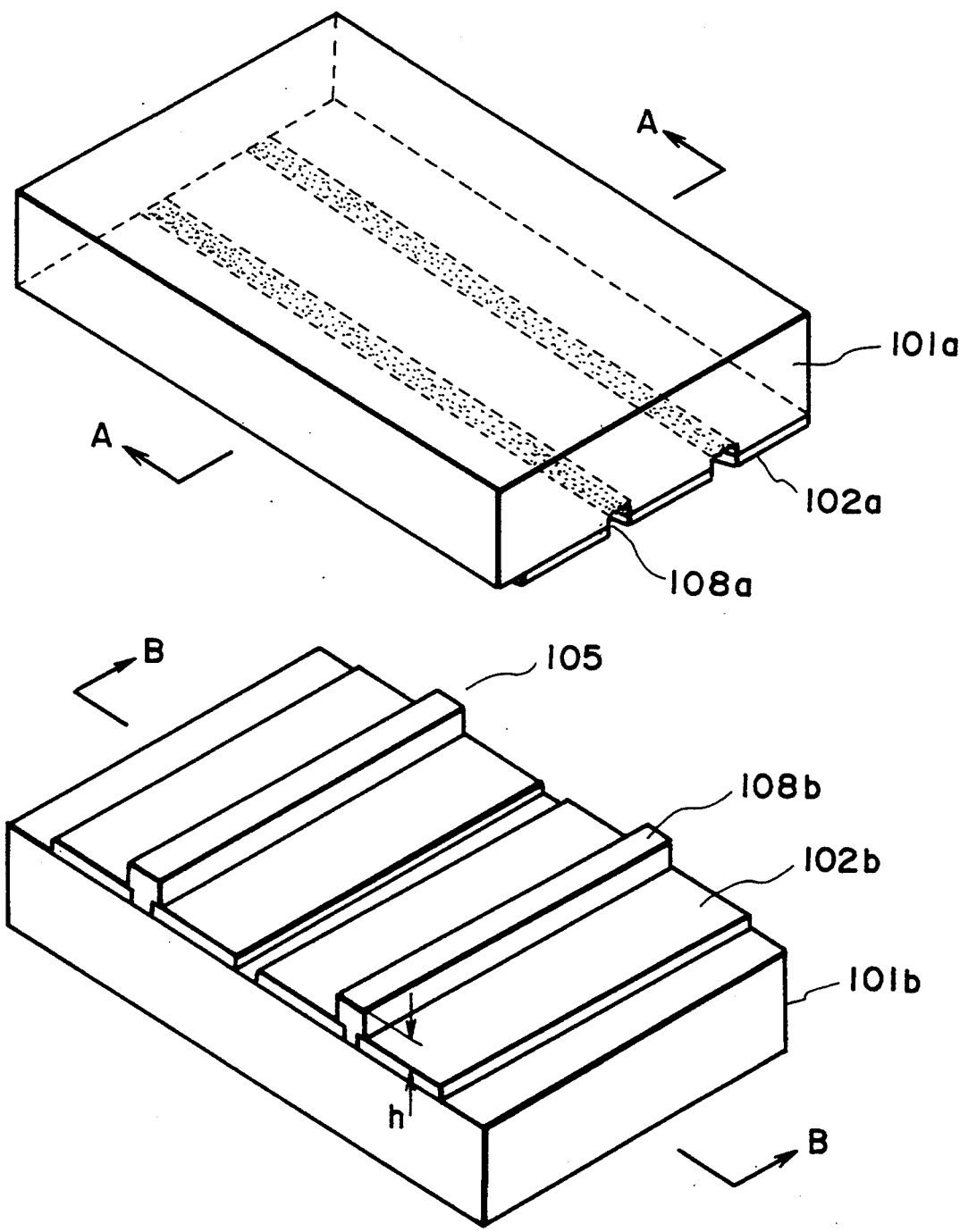
F I G. 10

FERROELECTRIC LIQUID CRYSTAL DEVICE WITH GROOVES BETWEEN ELECTRODE ON ONE SUBSTRATE, RIDGES ON THE OTHER

FIELD OF THE INVENTION AND RELATED ART

The present invention relates to a liquid crystal device using a chiral smectic liquid crystal, particularly a ferroelectric liquid crystal device having suppressed an increase in cell gap or occurrence of void caused by movement of liquid crystal molecules during multiplexing device.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

For an optical modulating device by use of a liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_O = \sin^2 4\Theta \sin^2(\Delta nd/\lambda)\pi,$$

wherein $I_O$: incident light intensity,
I: transmitted light intensity,
$\Theta$: tilt angle,
$\Delta n$: refractive index anisotropy,
d: thickness of the liquid crystal layer,
$\lambda$: wavelenght of the incident light.
The tilt angle $\Theta$ in the above-mentioned non-helical structure is recognized as a half of an angle between the average molecular axis directions of liquid crystal molecules in a twisted alignment in a first orientation state and a second orientation state. According to the above equation, it is shown that a tilt angle $\Theta$ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

Alignment states including a chevron structure of smectic layers may be described based on two types of alignment modes C1 and C2 as shown in FIG. 4. Referring to FIG. 4, reference numeral 31 denotes a smectic layer showing ferroelectricity, 32 denotes a C1 alignment region, and 33 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates 14a and 14b (chevron structure) as shown in FIG. 4. The bending of the layers 31 can be caused in two ways corresponding to the C1 and C2 alignment as shown. As is well known, liquid crystal molecules at the substrate surfaces are aligned to form a certain angle (pre-tilt) as a result of rubbing in a direction A in such a manner that their heads (leading ends) in the rubbing direction are up (or away) from the substrate surfaces. Because of the pre-tilt, the C1 and C2 alignment states are not equivalent to each other with respect to their elastic energy, and a transition between these states can be caused at a certain temperature or when supplied with a mechanical stress. When the layer structure shown in FIG. 4 is viewed in plan as shown in the upper part of FIG. 4, a boundary 34 of transition from C1 alignment (32) to C2 alignment (33) in the rubbing direction A looks like a zigzag lightning and is called a lightning defect, and a boundary 35 of transition from C2 alignment (33) to C1 alignment (32) forms a broad and moderate curve and is called a hairpin defect.

When FLC is disposed between a pair of substrates 14a and 14b and placed in an alignment state satisfying a relationship of $\Theta < \alpha + \delta$ . . . (1), wherein $\alpha$ denotes a pretilt angle of the FLC, $\Theta$ denotes a tilt angle (a half of cone angle), and $\delta$ denotes an angle of inclination of SmC* layer, there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $\Theta_a$ therebetween in the absence of an electric field satisfying a relationship of $\Theta > \Theta_a > \Theta/2$ . . . (2) are inclusively referred to as a uniform state.

In the uniform state, the directors are believed to be not twisted between the substrates in view of optical properties thereof. FIG. 5A is a schematic view illustrating director positions between the substrates in the respective states in C1 alignment. More specifically, at 51–54 are respectively shown changes in director positions between the substrates in the form of projections of directors onto cone bottoms as viewed from each bottom. At 51 and 52 is shown a splay state, and at 53 and 54 is shown a director arrangement which is believed to represent a uniform alignment state. As is understood from FIG. 5A, at 53 and 54 representing a uniform state, the molecule position (director) is different from that in the splay state either at the upper substrate or lower substrate. FIG. 5B shows two states in C2 alignment between which no switching is observed at the boundaries but an internal switching is observed. The uniform state in C1 alignment provides a larger tilt angle $\Theta_a$ and thus a higher contrast than the conventionally used bistable state in C2 alignment.

However, in a ferroelectric liquid crystal having a uniform alignment state based on the condition of $\Theta > \Theta a > \Theta/2$, a problem has been found as follows.

According to our experiments, when a ferroelectric liquid crystal cell 60 including a ferroelectric liquid crystal of a non-helical structure in a high pretilt alignment state in a cell region defined by a sealant 70 is driven by a driver including a scanning electrode driver circuit 68 and a data electrode driver circuit 69 to continuously write in a white (61) or black (62) fixed pattern as shown in FIG. 6, liquid crystal molecules are caused to move in different directions 63 and 64 in parallel with the extension direction of chiral smectic C layers and perpendicular to the rubbing direction 67 corresponding to the molecular positions for displaying a white display state (region 61) and a black display state (region 62), respectively. As a result, at the destination sides of the liquid crystal molecular movement, the liquid crystal layer is caused to have an increased thickness while enlarging the cell gap to form portions 65 colored in pale yellow (yellowing). On the opposite sides of the liquid crystal molecular movement, voids 66 lacking liquid crystal molecules are formed. These phenomena are caused most noticeably in the neighborhood of the seal 70 and propagated toward the inside of the cell.

SUMMARY OF THE INVENTION

In view of the above-mentioned problems of prior art, an object of the present invention is to prevent a display failure or display quality deterioration caused when a white or black fixed pattern is continuously written by driving a ferroelectric liquid crystal device comprising a ferroelectric liquid crystal disposed between a pair of substrates having scanning electrodes and data electrodes, respectively.

An object of the present invention is to suppress the above-mentioned liquid crystal movement and minimize or remove the increase in cell thickness without impairing the image quality.

According to the present invention, there is provided a ferroelectric liquid crystal display device, comprising: a first substrate having thereon elongated transparent electrodes constituting data electrodes, a second substrate having thereon elongated transparent electrodes constituting scanning electrodes, and a ferroelectric liquid crystal disposed between the first and second substrates; wherein at least one of the first and second substrates has a stripe elevation in parallel with the longitudinal direction of the elongated transparent electrodes on each of the elongated transparent electrodes. More specifically, a plurality of the stripe elevation is formed in a height of several hundred angstrom on each elongated transparent electrode by disposing plural thin stripe electrodes on or below each elongated transparent electrode.

According to another aspect of the present invention, there is provided a ferroelectric liquid crystal display device, comprising: a first substrate having thereon elongated transparent electrodes constituting data electrodes, a second substrate having thereon elongated transparent electrodes constituting scanning electrodes, and a ferroelectric liquid crystal disposed between the first and second substrates; wherein each of the first and second substrates has thin stripe electrodes having a width which is at most 1/10 of that of each elongated transparent electrode below the elongated transparent electrodes. The thin stripe electrodes may be formed of a transparent electroconductive material similarly as the elongated transparent electrodes or a non-transparent metal electrode material.

According to a third aspect of the present invention, there is provided a ferroelectric liquid crystal device, comprising: a pair of substrates each having thereon a group of elongated electrodes and a ferroelectric liquid crystal disposed between the substrates, the groups of elongated electrodes on the pair of substrates being disposed to cross each other; wherein one substrate is provided with surface unevennesses at parts between the elongated electrodes, and the other substrate is provided with ridges having a height with respect to the electrode surface at parts between the elongated electrodes. It is preferred that the surface unevennesses have a maximum difference in height of at least 0.1 μm and the ridges have a maximum height of at least 0.3 μm with respect to the electrode surface level of the associated substrate.

According to a further aspect of the present invention, there is provided a ferroelectric liquid crystal device, comprising: a pair of substrates each having thereon a group of elongated electrodes and a ferroelectric liquid crystal disposed between the substrates, the groups of elongated electrodes on the pair of substrates being disposed to cross each other; wherein one substrate is provided with grooves having a depth with respect to the substrate surface at parts between the elongated electrodes, and the other substrate is provided with ridges having a height with respect to the electrode surface at parts between the elongated electrodes. It is preferred that the surface unevennesses have a maximum depth of at least 0.1 μm with respect to the associated substrate surface level and the ridges have a maximum height of at least 0.3 μm with respect to the electrode surface level of the associated substrate.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are respectively a partial sectional vie of transparent electrodes used in an embodiment of the liquid crystal display device according to the invention.

FIG. 3 is a graph showing a relationship between the velocity of liquid crystal molecular movement and the thickness and pitch of stripe conductor films on the transparent electrodes.

FIG. 8A is a partial sectional view of a substrate used in an embodiment of the liquid crystal display device according to the invention, and FIG. 8B is a corresponding plan view.

FIGS. 9A and 9B illustrate a partial structure used in another embodiment of the liquid crystal display device according to the invention.

FIG. 10 is an exploded schematic perspective view of an embodiment of the liquid crystal device (cell) according to the invention.

DESCRIPTION OF THE PREFERRED EMBODIMENTS

According to our study, the increase in cell thickness at the cell side is recognized to be caused by a pressure increase which in turn is caused by movement of liquid crystal molecules in a particular direction due to driving. The reason why such a force causing the liquid crystal molecule movement occurs is not clear as yet, but it may be attributable to an electrodynamic effect caused by perturbation of liquid crystal molecule dipole moments in an AC-like electric field caused by continuation of drive pulses. Further, according to our experiments, the directions 63 and 64 of the liquid crystal movement are determined in relation with the rubbing direction 67 and the average liquid crystal molecular axis position 71 or 72 as shown in FIG. 7.

Figure 4:
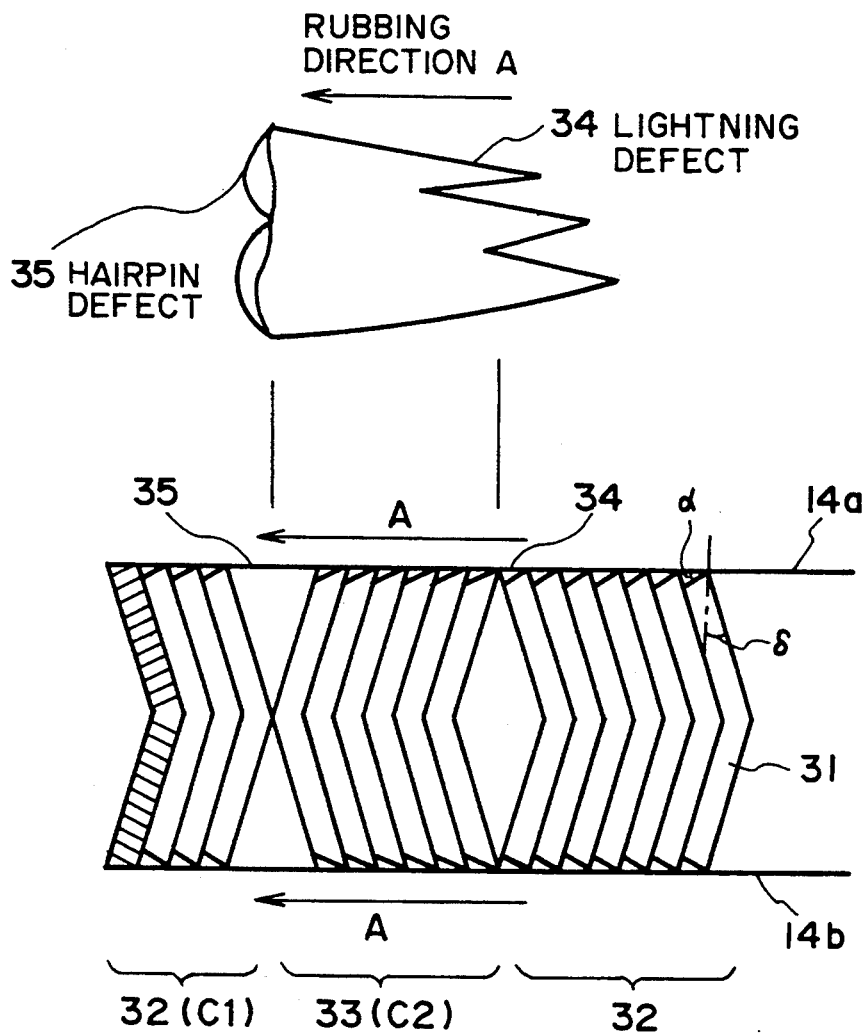
FIG. 4 is an explanatory view for illustrating an alignment state occurring in a chiral smectic liquid crystal used in the invention.
Figure 5B:
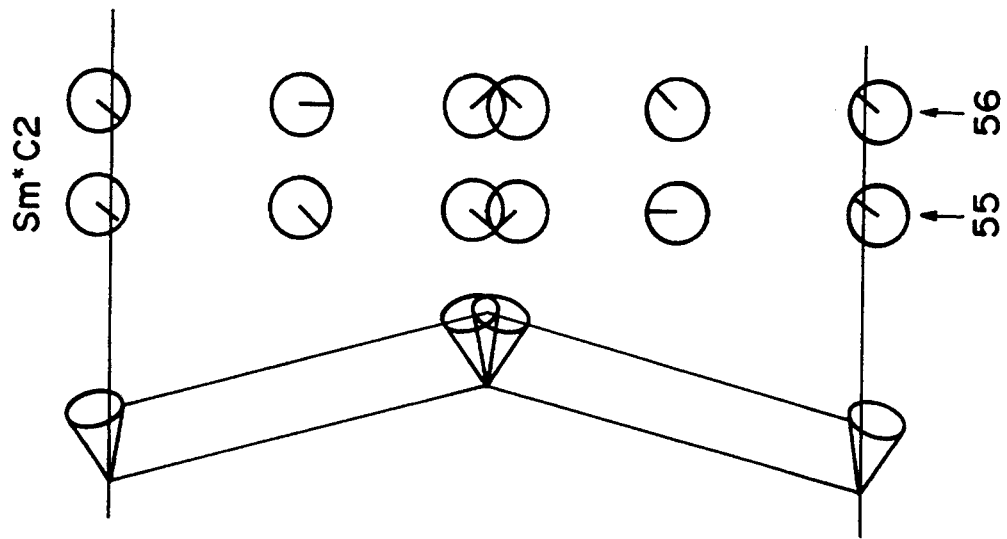
FIGS. 5A and 5B are explanatory views for illustrating changes in director orientation according to various positions between substrates in C1 alignment and C2 alignment, respectively.
Figure 5A:
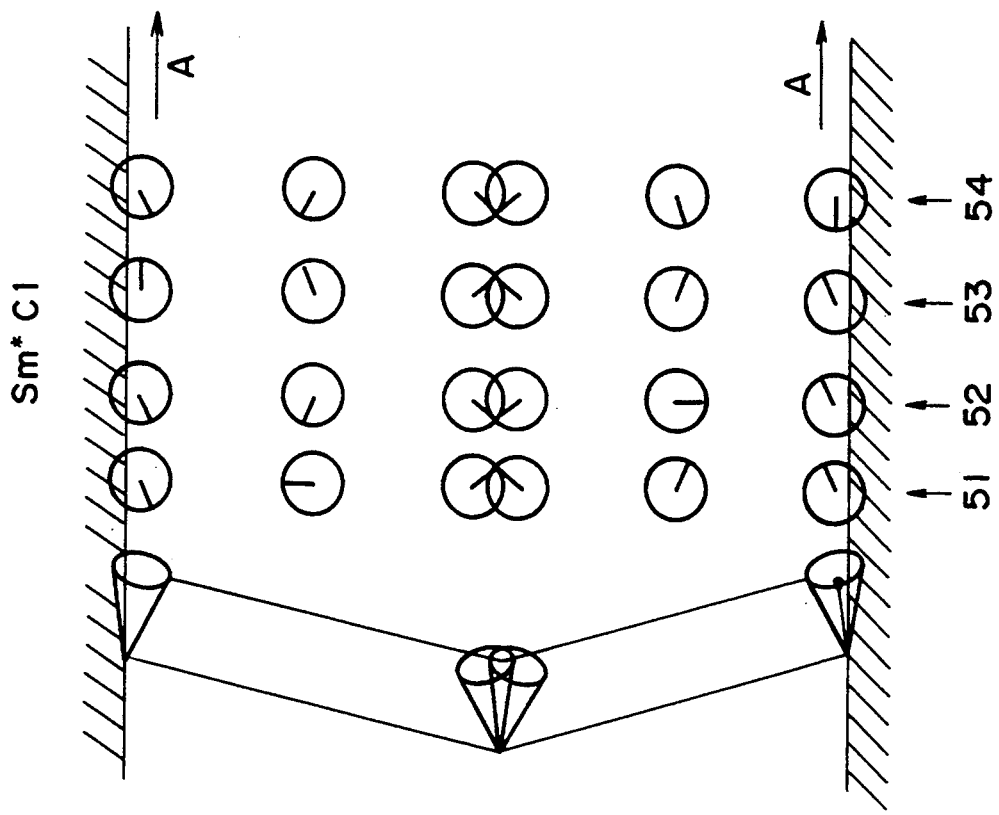
Figure 6:
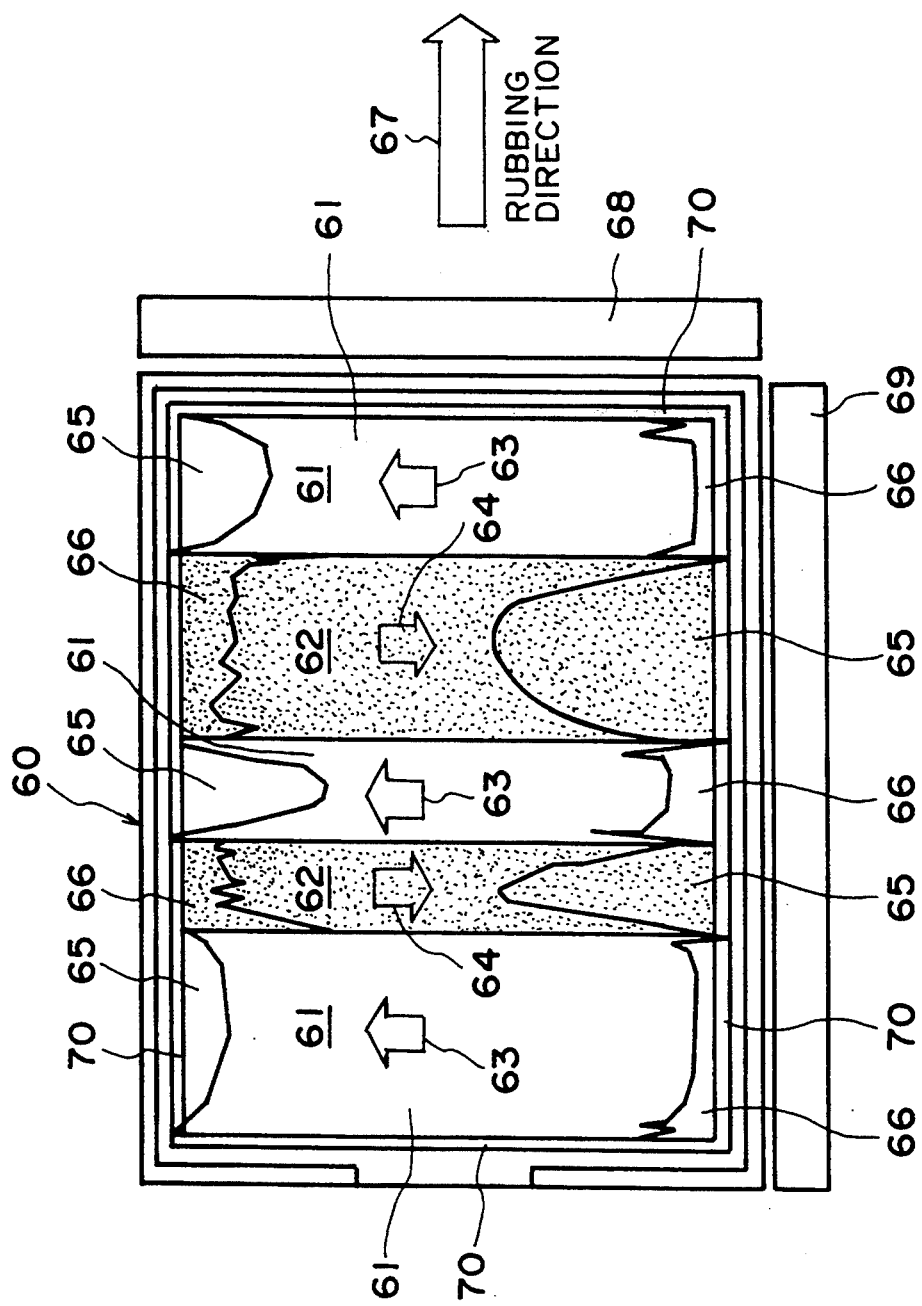
FIG. 6 is a front view of a conventional liquid crystal display apparatus when it is driven for a long time for displaying a fixed pattern.
Figure 7A:
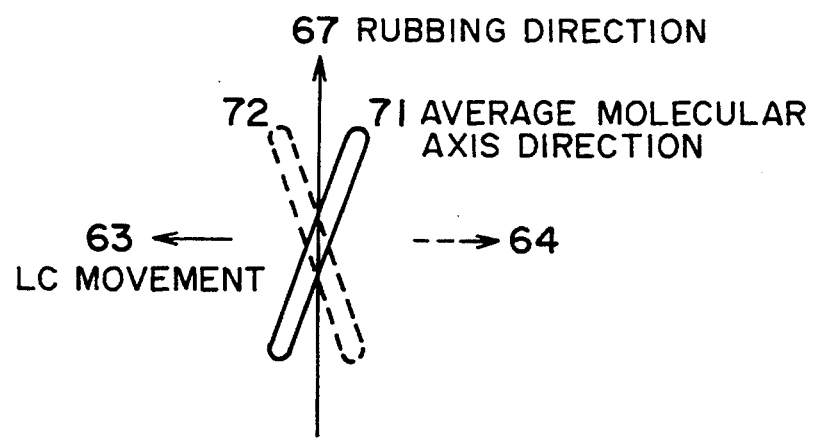
FIGS. 7A and 7B are explanatory views for illustrating a liquid crystal molecular movement direction.
Figure 7B:
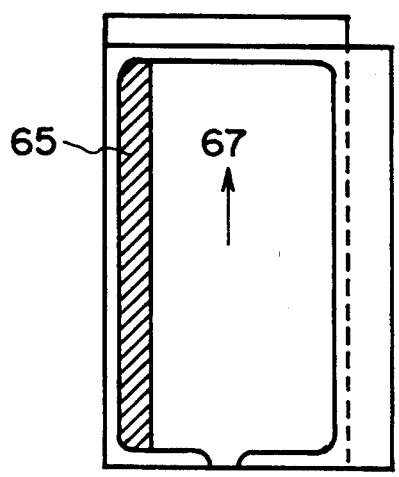

As the moving direction of liquid crystal molecules is related with the rubbing direction, the above-mentioned phenomenon is assumed to depend on the pre-tilt state at the substrate surfaces. Referring to FIGS. 7A and 7B, reference numeral 71 (or 72 in a reverse orientation state) denotes an average molecular axis (director) orientation. When the liquid crystal molecules (described herein as having a negative spontaneous polarization) are oriented to provide the average molecular axis 71 and are supplied with a certain strength of AC electric field not causing a switching to the orientation state 72, the liquid crystal molecules are liable to move in the direction of an arrow 62 in the case where the substrates are provided with rubbing axes extending in parallel and in the same direction 67. As described, this liquid crystal movement phenomenon depends on an alignment state in the cell.

In device of the present invention, a stripe-shaped elevation is formed on a transparent electrode to hinder the continuous uniformity of an SmC layer in a pixel. This is possible without impairing the uniformity of alignment. As a result, the portion constituting the center of liquid crystal molecular movement is made non-continuous in the liquid crystal layer thickness direction, thus being able to remarkably lower the moving speed of liquid crystal molecules.

Hereinbelow, some embodiments of the present invention will be described with reference to drawings.

FIG. 1 is a partial sectional view of a cell structure used in an embodiment of the liquid crystal device according to the present invention. Referring to FIG. 1, the cell comprises a glass substrate 3 on which are disposed stripe transparent electrodes 1 constituting data electrodes or scanning electrodes and further thereon stripe conductor films 2 extending in the longitudinal direction of the stripe transparent electrodes 1. The transparent electrodes 1 are formed of 1500 Å-thick stripes of ITO having a width of 200 μm with a spacing of 10 μm from an adjacent one. The stripe conductor films 2 are formed of 500 Å-thick Mo films disposed in a width of 20 μm at a pitch of 50 μm.

In a particular example, a data electrode plate and a scanning electrode plate each having transparent electrodes 1 and stripe conductor films 2 as shown in FIG. 1 were provided and respectively coated with an insulating film and an alignment film and then were superposed with each other to form a blank cell, which was filled with a liquid crystal to form a liquid crystal cell. When the cell was subjected to a continuous voltage application, the cell thickness increase was only about 10% or less after 500 hours, whereas the increase reached about 50 % after 24 hours in a conventional cell using no stripe conductor films as described above.

Similar effects were observed when the Mo stripes were replaced with ITO stripes of the same dimension.

As a result of testing by using different heights and pitches of the stripe conductor films and different voltages, a relationship as shown in FIG. 3 was observed, thus showing the effectiveness of the stripe conductor films for suppressing liquid crystal molecular movement.

Another embodiment is shown in FIG. 2.

As a particular example, a liquid crystal cell was prepared by using a pair of electrode plates each having a structure shown in FIG. 2. First, 500 Å-thick stripe ITO films 2 were formed in a width of 20 μm and a pitch of 50 μm at parts of drive electrodes on each glass substrate 3 and then covered with 1500 Å-thick ITO transparent electrodes 1 in a width of 200 μm extending in the same direction as the ITO stripes 2. The thus prepared data electrode plates and scanning electrode plates were then respectively covered with an insulating film and an alignment film and were superposed with each other to form a blank cell, which was then filled with a ferroelectric liquid crystal to form a ferroelectric liquid crystal cell in the same manner as in the above example. When the cell was subjected to a voltage application test in the same manner as in the previous examples, the cell thickness increase was only about 10% or less after 500 hours of continuous voltage application compared with about 50% increase after 24 hours in a conventional cell as described above.

Similar results were obtained when the ITO stripe films were replaced by stripe films of metals such as Mo and Cr. A similar relationship as shown in FIG. 3 was also observed between the liquid crystal molecule moving velocity and the height and pitch of the stripe conductor films.

According to another embodiment of the present invention, in a ferroelectric liquid crystal device comprising a ferroelectric liquid crystal disposed between a pair of substrates having data electrodes and scanning electrodes, respectively, constituting stripe transparent electrodes for display, thin stripes of transparent conductive materials or other metal materials having a width at most 1/10 that of the stripe transparent electrode are disposed below the display transparent electrode to provide the display transparent electrode with an unevenness on the order of several hundred angstroms, thereby hindering the continuous uniformity of an SmC layer in a pixel. This is possible without impairing the uniformity of alignment. As a result, the portion constituting the center of liquid crystal molecular movement is made non-continuous in the liquid crystal layer thickness direction, thus being able to remarkably lower the moving speed of liquid crystal molecules.

Instead of selecting the direction of thin stripes in relation with the stripe transparent electrodes, the direction of the thin stripes may be correlated with the alignment direction of a substrate on which the thin stripes are formed so as to further effectively suppressing the liquid crystal molecular movement and further effectively preventing the deterioration of display quality. More specifically, it is possible to optimize the above-mentioned effect of suppressing the liquid crystal molecular movement by selecting the directions of the thin stripes formed on the respective substrates so that the directions are made parallel to or perpendicular to the rubbing directions provided to the respective substrates on which the thin stripes are formed or that the thin stripes are disposed in parallel to the rubbing direction on one substrate and perpendicularly to the rubbing direction on the other substrate.

Description is made with reference to the drawings.

FIG. 8A is a partial sectional view of a cell structure used in an embodiment of the liquid crystal device according to the present invention, and FIG. 8B is a corresponding partial plan view. Referring to FIGS. 8A and 8B, the cell comprises a glass substrate 84 on which are disposed thin stripe electrodes 81, main stripe transparent electrodes 82 (only one is shown) constituting data electrodes or scanning electrodes so as to cover the thin stripe electrodes 81, and metal auxiliary electrodes 83 of Al or Mo each formed along a main transparent electrode 82 so as to enhance the conductivity of the transparent electrode 82. The thin stripe electrodes are composed of 500 Å-thick ITO stripes disposed in a width of 10 μm at a pitch of 20 μm. The main stripe transparent electrodes 82 are composed of 1500 Å-thick ITO stripes disposed in a width of 170 μm at a pitch of 200 μm.

In a particular example, a data electrode plate and a scanning electrode plate each having thin stripe electrodes 81, transparent electrodes 82 and metal auxiliary electrodes 83 as shown in FIGS. 8A and 8B were provided and respectively coated with an insulating film and an alignment film followed by rubbing. The electrode plates were superposed with each othher to form a blank cell, which was then filled with a liquid crystal to form a liquid crystal display device. In this instance, the rubbing was effected in directions perpendicular to and in parallel with the main stripe transparent electrodes 82 and the thin stripe electrodes 81 disposed therebelow on the scanning electrode plate and the data electrode plate, respectively. When the device was subjected to a continuous voltage application test under a drive voltage of 20 volts, the cell thickness increase was at most 0.1 μm after 500 hours, whereas the increase reached 0.5 μm or larger after 12 hours due to molecular movement in a conventional cell wherein the thin stripe electrodes 81 were not formed.

FIGS. 9A and 9B illustrate another embodiment. As shown in these figures, liquid crystal display devices were prepared in a similar manner as in the above example except that the rubbing was applied to the respective electrode plates in directions which were respectively at an angle of 45 degrees with respect to the main transparent electrodes 82 and the thin stripe electrodes 81 were disposed in parallel with the rubbing directions applied to the respective electrode plates.

Separately, two additional liquid crystal devices were prepared by rubbing at 45 degrees similarly, including one wherein the thin stripe electrodes 81 below the main stripe transparent electrodes 82 were disposed perpendicularly to the rubbing directions on both electrode plates, and the other wherein the thin stripe electrodes were disposed perpendicular to the rubbing direction on one electrode plate and in parallel with the rubbing direction on the other electrode plate.

The thus prepared four types of liquid crystal display devices were subjected to a continuous voltage application test in the same manner as in the previous example, whereby an effective function of suppressing liquid crystal molecular movement was observed in any of the liquid crystal display devices. In this way, if the thin stripes 81 below the main transparent electrodes 82 are disposed not in parallel with the main transparent electrodes but in correlation with the rubbing direction, the liquid crystal molecular movement can be effectively suppressed.

According to our experiments, the liquid crystal movement also depends on an alignment state in a cell as described above. More specifically, the liquid crystal movement occurs very hardly n an alignment other than SmC*, such as focalconic alignment and homeotropic alignment. Accordingly, it has been known that, if an alignment other than SmC* is formed between electrodes (non-pixel portions), the liquid crystal movement in the direction perpendicular to the electrodes is suppressed. However, if non-SmC* alignment is developed between electrodes on both substrates, each pixel is surrounded by non-SmC* alignment whereby an alignment defect is liable to develop in the pixels.

Further, according to another experiment of ours, the liquid crystal movement depends on a stepwise difference in a cell. More specifically, if a stepwise difference in elevation exceeding a certain degree is present in a cell, the liquid crystal movement occurs very hardly, so that, if ridges are formed between electrodes, the liquid crystal movement across the ridges is suppressed. However, if such ridges are formed between electrodes on both substrates, a cell thickness irregularity is liable to develop or the liquid crystal injection becomes difficult due to the height of the ridges.

Based on these results of our study, according to an embodiment of the present invention, minute unevenness is formed between electrodes on one substrate to form an alignment other than SmC* as described above between the electrodes (i.e., between pixels) and, on the other substrate, a ridge higher than the electrodes is formed, whereby the liquid crystal movement is suppressed without impairing the image quality.

Figure 11:
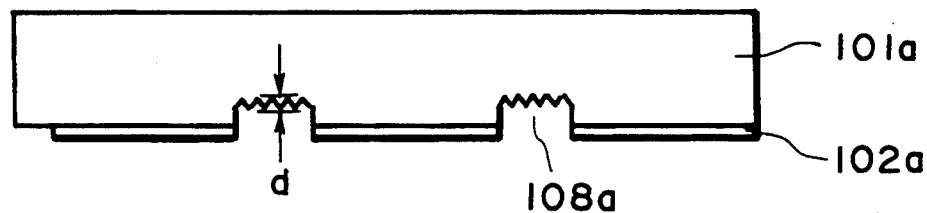
FIGS. 11 and 12 are respectively a sectional view taken along line A—A and line B—B, respectively, in FIG. 10.
Figure 12:
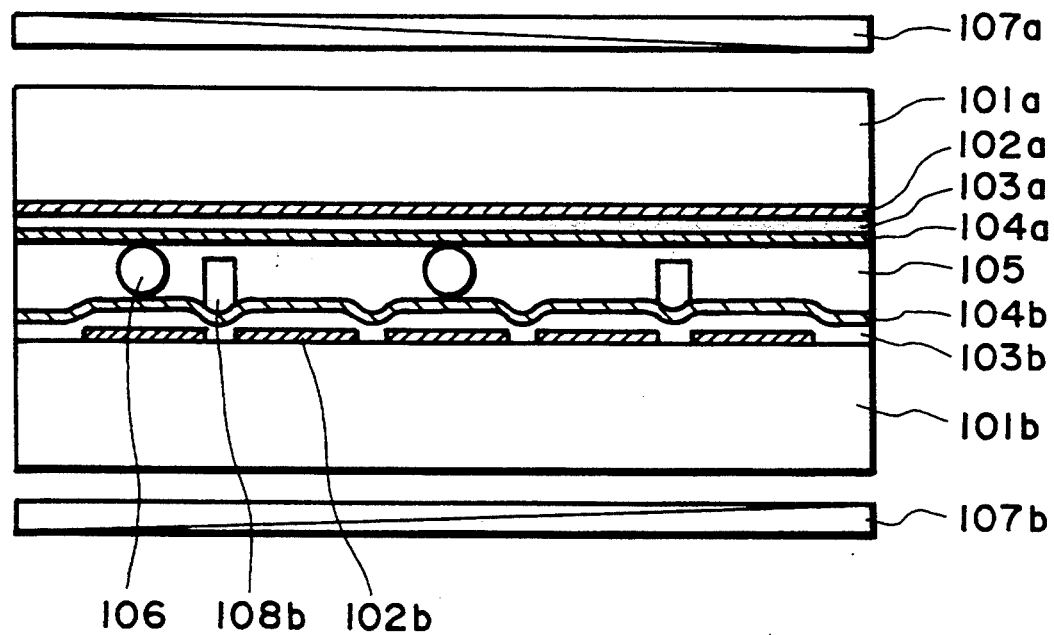

FIG. 10 is a partly broken perspective illustration of a liquid crystal cell according to an embodiment of the invention, FIG. 11 is a sectional view of an upper substrate thereof taken along the line A—A, and FIG. 12 is a sectional view taken along the line B—B in FIG. 12. Referring to these figures, the liquid crystal cell includes a pair of an upper substrate 101a and a lower substrate 101b disposed in parallel with each other and having thereon about 400–200 Å-thick transparent electrodes 102a and 102b, respectively, in the form of stripes. Between the upper substrate 101a and the lower substrate 101b is disposed a ferroelectric liquid crystal, preferably a ferroelectric smectic liquid crystal 105 of a non-helical structure having at least two stable states, by the medium of alignment control films 104a and 104b. The alignment control films 104a and 104b have been provided with an aligning treatment for aligning the smectic liquid crystal 105. Depending on the direction of the aligning treatment, the direction of the layer formation of the smectic liquid crystal can be controlled. It is possible to insert, e.g., 200–300 Å-thick insulating films 103a and 103b of $SiO_2$, $TiO_2$, $Ta_2O_5$, etc., between the alignment control films 104a, 104b and the transparent electrodes 102a, 102b. The spacing between the substrates is held by silica beads 106 with an average particle size of, e.g., about 1.5 μm (generally 0.1–3.5 μm). The entire cell structure is sandwiched between polarizing plates 107a and 107b.

The upper substrate 101a is provided with minute unevennesses 108a having a maximum difference in height d of 0.1 μm or larger between the stripe transparent electrodes 102a. The minute unevennesses 108a may be formed during a patterning step for forming the transparent electrodes 102a in the following manner.

The substrates 101a is coated with a transparent electrode layer and a photoresist layer, which is then exposed to form a pattern of the transparent electrodes 102a, followed by etching to form the transparent electrodes 102a. Then, before peeling the photoresist, the substrate surface parts between the electrodes 102a are etched with a mixture liquid of $NH_4F$, $H_2O$ and a weak acid, etc. to form the surface unevennesses 108. Then, the substrate is sufficiently washed with water and then the remaining photoresist is removed by peeling. The above-mentioned mixture liquid of $NH_4F$, $H_2O$ and a weak and, etc., is a pasty etchant capable of being applied by screen printing and is commercially available under a trade name of "DECA GLASSETCH" (from DECA PRODUCTS CO., Belgium). The maximum difference in height d can be controlled by the mixing ratios among $NH_4F$, $H_2O$ and the weak acid, etc., and the etching time.

Figure 13:
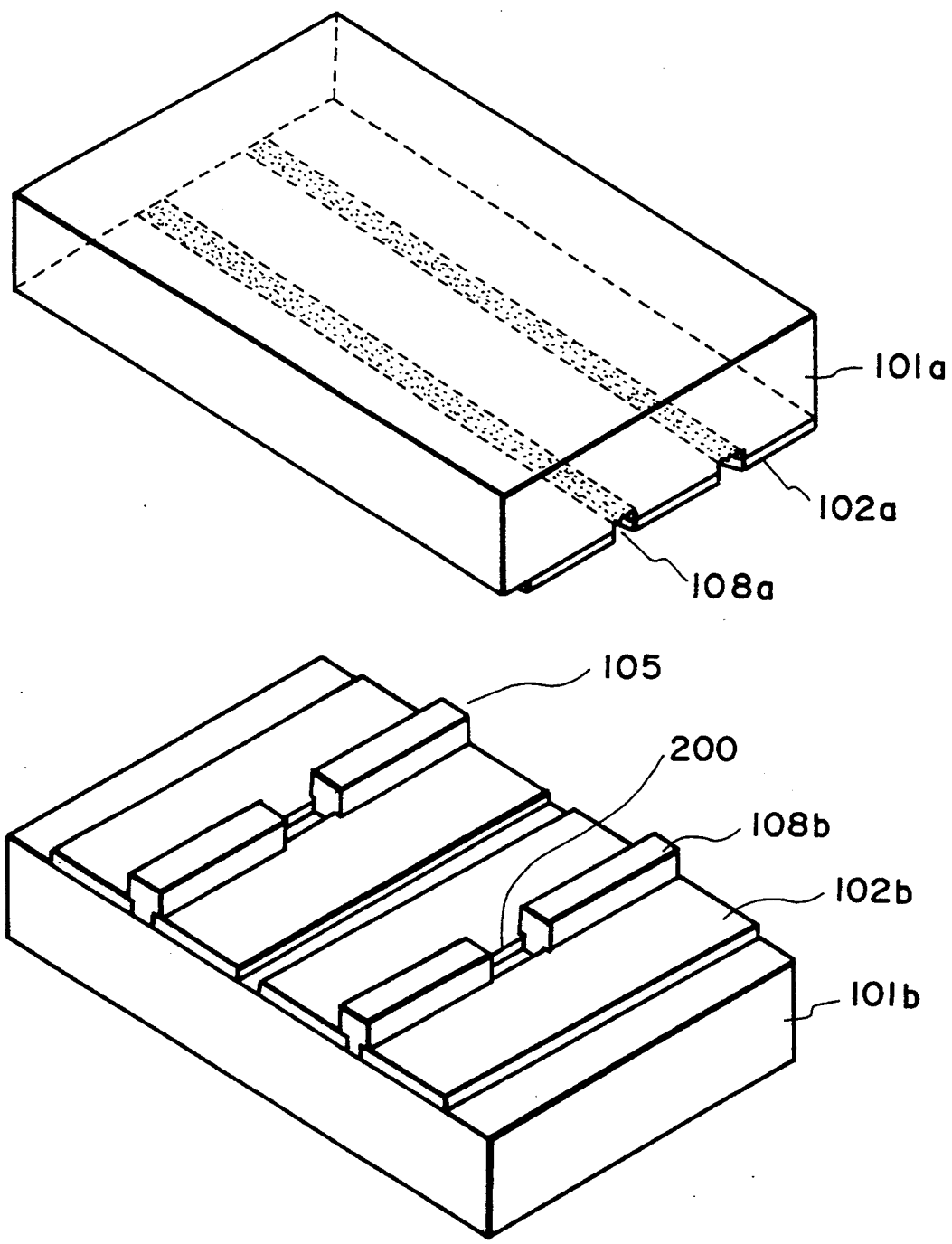
FIG. 13 is an exploded schematic perspective view showing a variation of the liquid crystal device shown in FIG. 10.

The substrate 101b is provided with ridges 108b formed between the stripe transparent electrodes 102b. The ridges 108b may be formed of, e.g., an insulating material such as polyimide, a metal such as Mo or Al, or a laminate of a metal and an insulating material, e.g., by photolithography. The ridges 108b may have a height $\bar{h}$ of 0.3 μm or larger, whereby the above-mentioned effect of suppressing liquid crystal movement is sufficiently exhibited. The height b can be almost the same as the cell gap. However, when the height $\bar{h}$ is large, the liquid crystal injection speed becomes slow, so that it is possible to provide a gap 200 between ridges 108b as shown in FIG. 13 in such a case.

The ferroelectric liquid crystal 105 may comprise a liquid crystal in a chiral smectic phase, more specifically in chiral smectic C phase (SmC*). A particularly preferred class of ferroelectric liquid crystal may include those showing cholesteric phase on a higher temperature side,-which may for example include a pyrimidine-based mixture liquid crystal showing the following phase transition series and characteristic values.

layer inclination angle $\delta = 11$ degrees
apparent tilt angle $\Theta_a = 11$ degrees.

EXAMPLE 1

Figure 14:
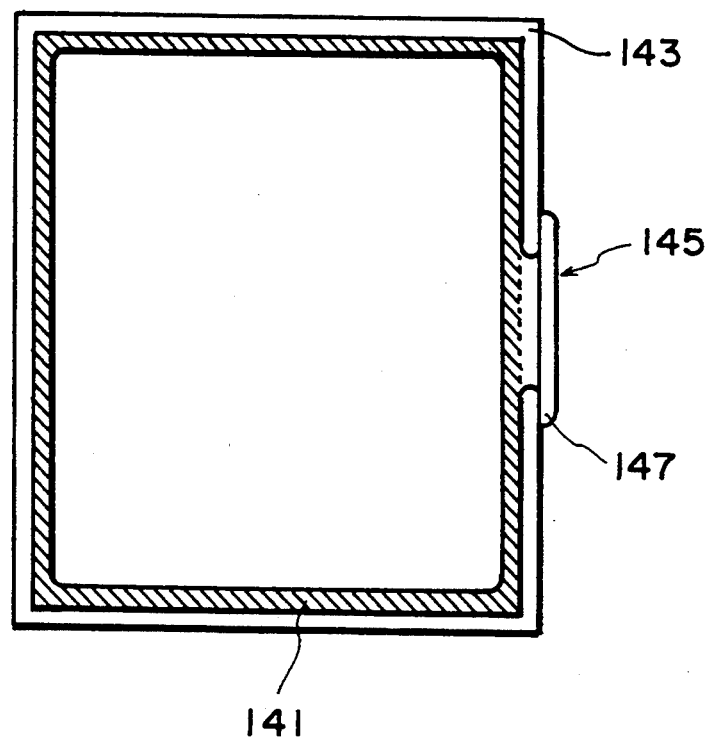
FIG. 14 is a schematic plan view of a liquid crystal device according to an embodiment of the invention for showing points of cell thickness measurement at the time of liquid crystal molecular movement.

A liquid crystal cell of the above-described structure having surface unevenness 108a with a maximum difference in height $\underline{d}$ of 0.1 μm and ridges 108b with a maximum height $\bar{h}$ of 0.3 μm was prepared in the above-described manner. The liquid crystal cell was driven for 7 hours by application of rectangular wave signals having a pulse width of 25 μsec, a voltage amplitude of 40 volts and a duty ratio of ⅓ and then subjected to measurement of a cell thickness change at cell peripheries 141 hatched in FIG. 14 (inside a seal 143 and a sealant 147 formed at an injection port). As a result, even a part showing the most noticeable change showed only an increase of about 4% with respect to the initial value. Further, the cell was sandwiched between cross nicol polarizers to observe coloring by eyes, whereas no region provided coloring indicating a noticeable increase in cell thickness. Further, the alignment state between the electrodes provided with surface unevennesses was observed through a polarizing microscope, whereby an alignment state (presumably in focalconic alignment) showing an clear extinction position was observed and confirmed to be different from SmC* alignment.

Comparative Example 1

A liquid crystal cell was prepared in the same manner as in Example 1 except that none of the surface unevennesses 108a and the ridges 108b were provided, and was then subjected to voltage application under the same conditions, whereby a cell thickness increase of about 41% was observed compared with the original value. When the cell was observed by eyes in the same manner as in Example 1, it was clearly observed that the region of a cell thickness increase was colored in yellow. When the alignment state between the electrodes was observed through a polarizing microscope, two states of dark and bright in SmC* alignment were observed and the alignment state there was that of SmC*.

Comparative Example 2

A liquid crystal cell was prepared in the same manner as in Example 1 except that the ridges 108b were not provided, and was subjected to voltage application under the same conditions as in Example 1, whereby cell thickness changes were observed at both cell sides which were perpendicular to the extension of the electrodes 102a provided with surface unevennesses 108a on the substrate 101a. The part of the most noticeable change showed an increase of about 22% compared with the original value. The region of the cell thickness increase was colored in yellow by eye observation.

Comparative Example 3

A liquid crystal cell was prepared in the same manner as in Example 1 except that the surface unevennesses 108a were not provided, and was subjected to voltage application under the same conditions as in Example 1, whereby cell thickness changes were observed at both

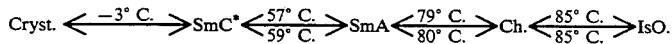

tilt angle $\Theta = 14$ degrees cell sides which were perpendicular to the extension of the electrodes 102b provided with the ridges 108b on the substrate 101b. The part of the most noticeable change showed an increase of about 18% compared with the original value. The region of the cell thickness increase was colored in yellow by eye observation.

Comparative Example 4

A liquid crystal cell was prepared in the same manner as in Example 1 except that the maximum height difference $\underline{d}$ of the surface unevennesses was changed to 0.05 μm and the maximum height $\underline{h}$ of the ridges 108b were changed to 0.2 μm. The cell was subjected to voltage application under the same conditions as in Example 1, whereby the part of the largest change in cell thickness showed an increase of about 13%. As a result of eye observation, the region with an increased cell thickness was slightly colored. When the alignment state between the electrodes was observed through a polarizing microscope, two states of bright and dark in SmC* were observed and the alignment state at the parts was confirmed to be that of SmC*.

EXAMPLE 2

A liquid crystal cell was prepared in the same manner as in Example 1 except that the maximum height difference $\underline{d}$ of the surface unevennesses was changed to 0.2 μm. The cell was subjected to voltage application under the same conditions as in Example 1, whereby the part of the largest change in cell thickness showed an increase of about 3%. As a result of eye observation, no region of cell thickness increase was recognized. When the alignment state at the parts provided with the surface unevennesses 108a between the electrodes 102a on the substrate 101a was observed through a polarizing microscope, it was confirmed to be that of homeotropic alignment.

Figure 15:
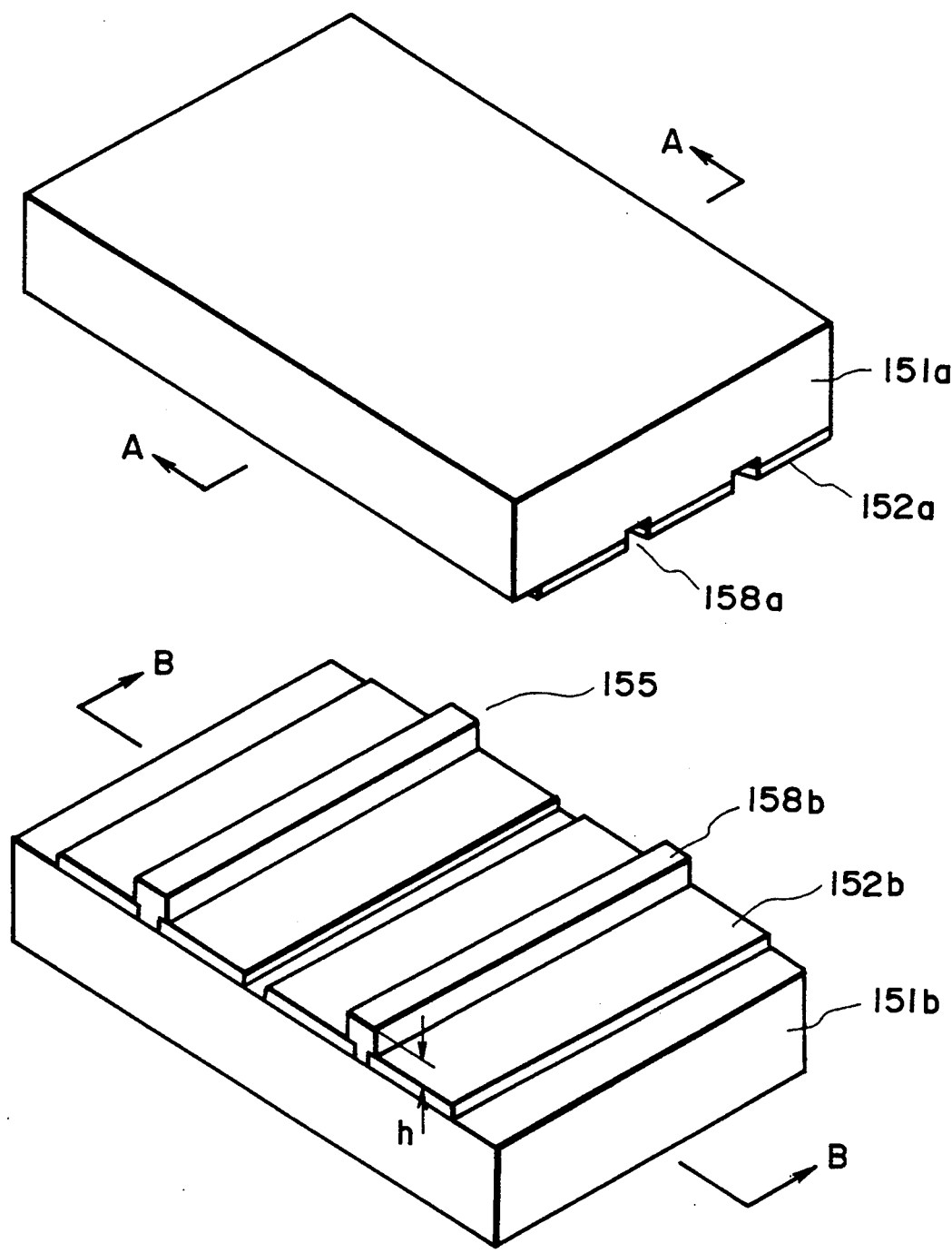
FIG. 15 is an exploded schematic perspective view of another embodiment of the liquid crystal device (cell) according to the invention.
Figure 16:
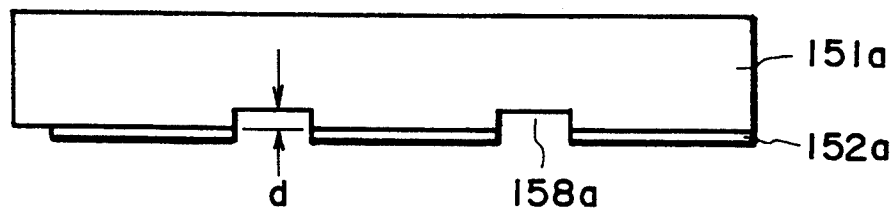
FIGS. 16 and 17 are respectively a sectional view taken along line A—A and line B—B, respectively, in FIG. 15.
Figure 17:
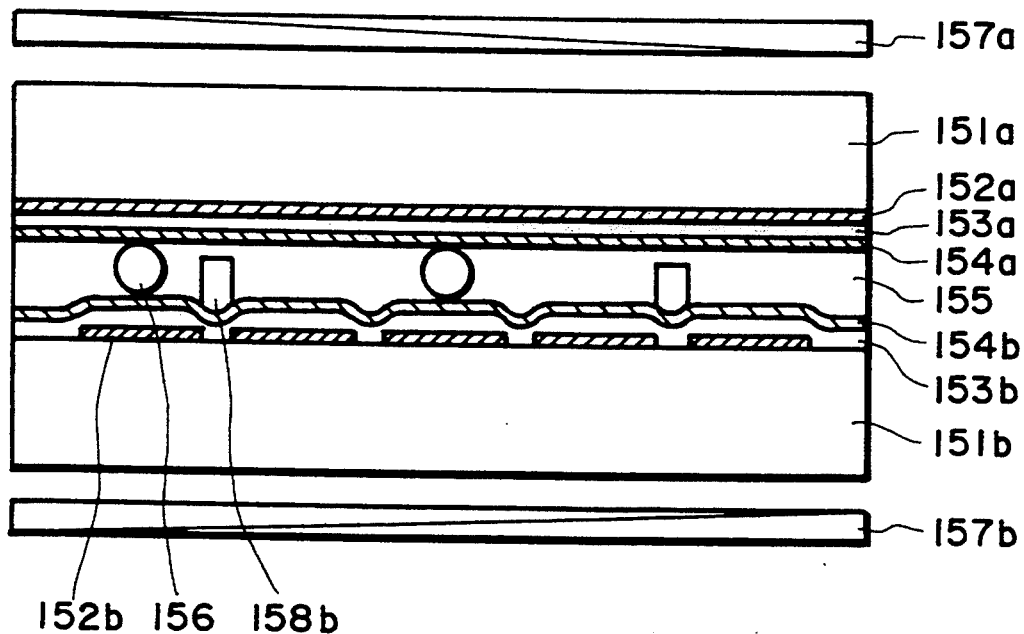

FIG. 15 is a partly broken perspective illustration of a liquid crystal cell according to an embodiment of the invention, FIG. 16 is a sectional view of an upper substrate thereof taken along the line A—A, and FIG. 17 is a sectional view taken along the line B—B in FIG. 15. Referring to these figures, the liquid crystal cell includes a pair of an upper substrate 151a and a lower substrate 151b disposed in parallel with each other and having thereon about 400–2000 Å-thick transparent electrodes 152a and 152b, respectively, in the form of stripes. Between the upper substrate 151a and the lower substrate 151b is disposed a ferroelectric liquid crystal, preferably a ferroelectric smectic liquid crystal 155 of a non-helical structure having at least two stable states, by the medium of alignment control films 154a and 154b. The alignment control films 154a and 154b have been provided with an aligning treatment for aligning the smectic liquid crystal 155. Depending on the direction of the aligning treatment, the direction of the layer formation of the smectic liquid crystal 155 can be controlled. It is possible to insert, e.g., 200–3000 Å-thick insulating films 153a and 153b of $SiO_2$, $TiO_2$, $Ta_2O_5$, etc., between the alignment control films 154a, 154b and the transparent electrodes 152a, 152b. The spacing between the substrates is held by silica beads 156 with an average particle size of, e.g., about 1.5 μm (generally 0.1–3.5 μm). The entire cell structure is sandwiched between polarizing plates 157a and 157b.

The upper substrate 151a is provided with grooves 158a having a maximum depth $\underline{d}$ of 0.1 μm or larger between the stripe transparent electrodes 152a. The grooves 158a may be formed during a patterning step for forming the transparent electrodes 152a in the following manner.

The substrates 151a is coated with a transparent electrode layer and a photoresist layer, which is then exposed to form a pattern of the transparent electrodes 152a, followed by etching to form the transparent electrodes 152a. Then, before peeling the photoresist, the substrate surface parts between the electrodes 152a are etched with a mixture liquid of $NH_4F$, $H_2O$ and a weak acid, etc. to form the grooves 158a. Then, the substrate is sufficiently washed with water and then the remaining photoresist is removed by peeling. The above-mentioned mixture liquid of $NH_4F$, $H_2O$ and a weak and, etc., is a pasty etchant capable of being applied by screen printing and is commercially available under a trade name of "DECA GLASSETCH" (from DECA PRODUCTS CO., Belgium). The depth $\underline{d}$ of the grooves 158a can be controlled by the mixing ratios among $NH_4F$, $H_2O$ and the weak acid, etc., and the etching time.

Figure 18:
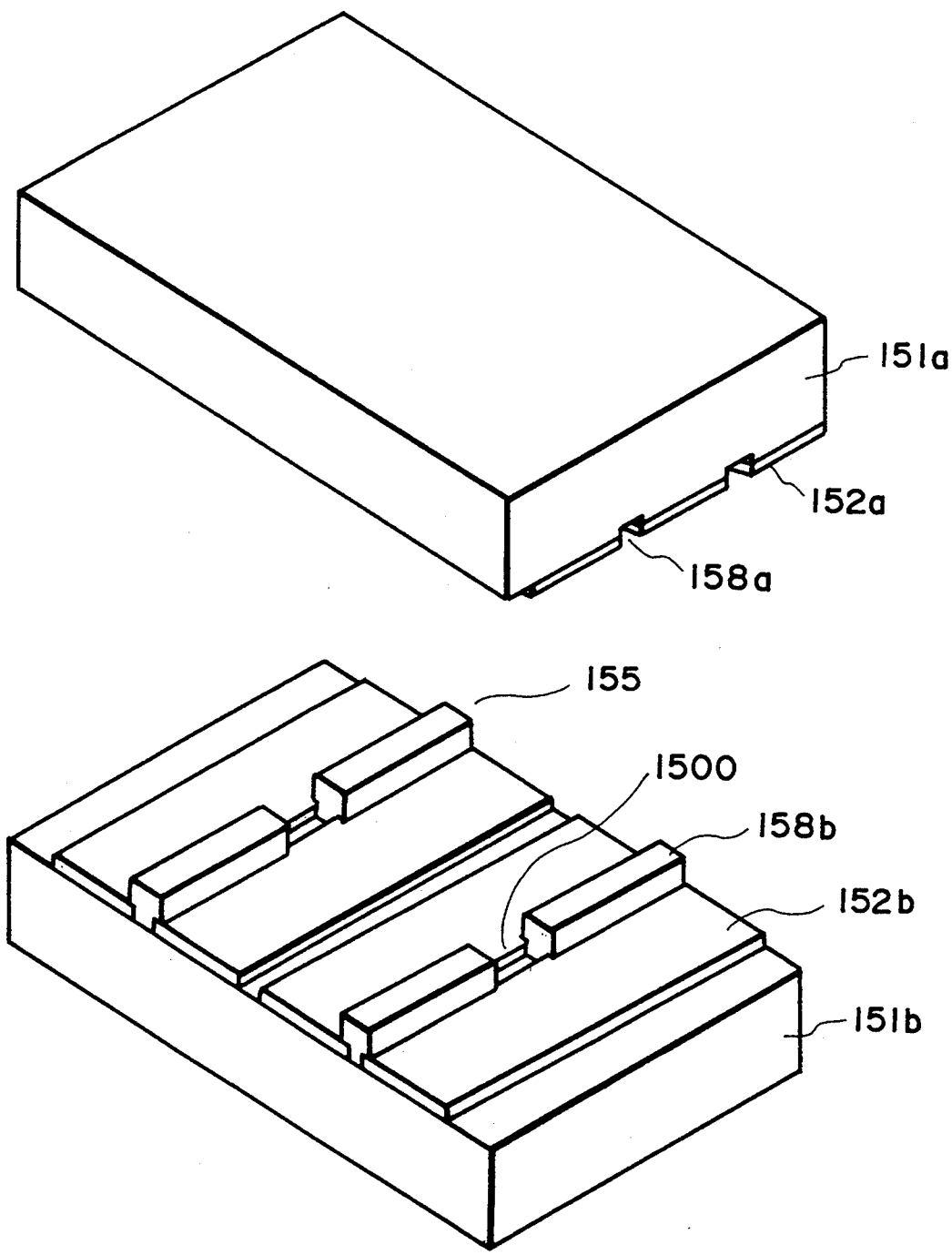
FIG. 18 is an exploded schematic perspective view showing a variation of the liquid crystal device shown in FIG. 15.

The substrate 151b is provided with ridges 158b formed between the stripe transparent electrodes 152b. The ridges 158b may be formed of, e.g., an insulating material such as polyimide, a metal such as Mo or Al, or a laminate of a metal and an insulating material, e.g., by photolithography. The ridges 158b may have a height $\underline{h}$ of 0.3 μm or larger, whereby the above-mentioned effect of suppressing liquid crystal movement is sufficiently exhibited. The height $\underline{h}$ can be almost the same as the cell gap. However, when the height $\underline{h}$ is large, the liquid crystal injection speed becomes slow, so that it is possible to provide a gap 1500 between ridges 158b as shown in FIG. 18 in such a case.

The ferroelectric liquid crystal 155 may comprise a liquid crystal in a chiral smectic phase, more specifically in chiral smectic C phase (SmC*) similarly as described above.

EXAMPLE 3

A liquid crystal cell of the above-described structure having grooves 158a with a maximum depth d of 0.1 μm and ridges 158b with a maximum height $\underline{h}$ of 0.3 μm was prepared in the above-described manner. The liquid crystal cell was driven for 7 hours by application of rectangular wave signals having a pulse width of 25 μsec, a voltage amplitude of 40 volts and a duty ratio of ½ and then subjected to measurement of a cell thickness change at cell peripheries 141 hatched in FIG. 14. As a result, even a part showing the most noticeable change showed only an increase of about 6% with respect to the initial value. Further, the cell was sandwiched between cross nicol polarizers to observe coloring by eyes, whereas no region provided coloring indicating a noticeable increase in cell thickness. Further, the alignment state between the electrodes provided with surface unevennesses was observed through a polarizing microscope, whereby an alignment state showing an clear extinction position was observed and confirmed to be different from SmC* alignment.

Comparative Example 5

A liquid crystal cell was prepared in the same manner as in Example 3 except that none of the grooves 158a and the ridges 158b were provided, and was then subjected to voltage application under the same conditions, whereby a cell thickness increase of about 41% was observed compared with the original value. When the cell was observed by eyes in the same manner as in Example 3, it was clearly observed that the region of a cell thickness increase was colored in yellow. When the alignment state between the electrodes was observed through a polarizing microscope, two states of dark and bright in SmC* alignment were observed and the alignment state there was that of SmC*.

Comparative Example 6

A liquid crystal cell was prepared in the same manner as in Example 6 except that the ridges 158b were not provided, and was subjected to voltage application under the same conditions as in Example 3, whereby cell thickness changes were observed at both cell sides which were perpendicular to the extension of the electrodes 152a provided with the grooves 158a on the substrate 151a. The part of the most noticeable change showed an increase of about 25% compared with the original value. The region of the cell thickness increase was colored in yellow by eye observation.

Comparative Example 7

A liquid crystal cell was prepared in the same manner as in Example 3 except that the grooves 158a were not provided, and was subjected to voltage application under the same conditions as in Example 3, whereby cell thickness changes were observed at both cell sides which were perpendicular to the extension of the electrodes 152b provided with the ridges 158b on the substrate 151b. The part of the most noticeable change showed an increase of about 18% compared with the original value. The region of the cell thickness increase was colored in yellow by eye observation.

Comparative Example 8

A liquid crystal cell was prepared in the same manner as in Example 3 except that the maximum depth $\underline{d}$ of the grooves 158a was changed to 0.05 μm and the maximum height $\underline{h}$ of the ridges 158b were changed to 0.2 μm. The cell was subjected to voltage application under the same conditions as in Example 3, whereby the part of the largest change in cell thickness showed an increase of about 17%. As a result of eye observation, the region with an increased cell thickness was slightly colored. When the alignment state between the electrodes was observed through a polarizing microscope, two states of bright and dark in SmC* were observed and the alignment state at the parts was confirmed to be that of SmC*.

EXAMPLE 4

A liquid crystal cell was prepared in the same manner as in Example 3 except that the maximum depth $\underline{d}$ of the grooves 158a was changed to 0.2 μm. The cell was subjected to voltage application under the same conditions as in Example 1, whereby the part of the largest change in cell thickness showed an increase of about 3%. As a result of eye observation, no region of cell thickness increase was recognized. When the alignment state at the parts provided with the grooves 158a between the electrodes 152a on the substrate 151a was observed through a polarizing microscope, an alignment state showing no clear extinction position and close to that of a focalconic alignment and the alignment state was confirmed to be different from that of SmC*.

As described above, according to the present invention, stripe-shaped minute projections are formed on a transparent electrodes to remarkably suppress the liquid crystal movement at the time of displaying a fixed pattern of white or black, thus being able to prevent the deterioration of display quality.

Further, according to the present invention, thin stripe electrodes are disposed below main electrodes in a width which is at most 1/10 that of a main electrode, it is possible to suppress the liquid crystal movement at the time of displaying a fixed pattern of white or black, thereby preventing the deterioration of display quality. Further, by disposing the thin stripe electrodes in a direction perpendicular or parallel to the rubbing direction, the effect of suppressing molecular movement in layers or between layers can be further enhanced.

Further, according to the present invention, one substrate is provided with minute unevennesses or grooves lower than the substrate level between electrodes and the other substrate is provided with ridges having a high exceeding the electrode level between electrodes, whereby a local change in cell thickness during drive is alleviated or removed without impairing the liquid crystal injection characteristic or image quality even in a ferroelectric liquid crystal device having a large area liquid crystal cell.

What is claimed is:

1. A ferroelectric liquid crystal display device, comprising:
a first substrate having thereon elongated transparent electrodes constituting data electrodes, a second substrate having thereon elongated transparent electrodes constituting scanning electrodes, and a ferroelectric liquid crystal disposed between the first and second substrates; wherein
at least one of the first and second substrates has stripe elevations parallel with the longitudinal direction of the elongated transparent electrodes on the elongated transparent electrodesk and
said ferroelectric liquid crystal is in a uniform alignment satisfying relationships of:ps
$\Theta < \alpha < \delta$ $\Theta > \Theta_a > \Theta/2$ and $\Theta < \alpha + \delta$ wherein $2\Theta$ denotes a cone angle, $\alpha$ denotes a pretilt angle, $\delta$ denotes an inclination angel of an SmC* layer and $\Theta_a$ denotes an apparent tilt angle of the ferroelectric liquid crystal.

2. A display device according to claim 1, wherein said elongated transparent electrodes have a plurality of thin stripe electrodes disposed thereon to form said plurality of stripe elevations.

3. A display device according to claim 1, wherein said elongated transparent electrodes have a plurality of thin stripe electrodes disposed therebelow to form said plurality of stripe elevations.

4. A display device according to claim 2 or 3, wherein said thin stripe electrodes are formed of a transparent electroconductive material.

5. A display device according to claim 2 or 3, wherein said thin stripe electrodes are formed of a non-transparent metal electrode material.

6. A ferroelectric liquid crystal device, comprising: a pair of substrates each having thereon a group of elongated electrodes and a ferroelectric liquid crystal disposed between the substrates, the groups of elongated electrodes on the pair of substrates being disposed to cross each other; wherein one substrate is provided with grooves having a depth with respect to the substrate surface at parts between the elongated electrodes, and the other substrate is provided with ridges having a height with respect to the electrode surface at parts between the elongated electrodes.

7. A device according to claim 6, wherein said grooves have a maximum depth of at least 0.1 μm with respect to the substrate surface of the associated substrate.

8. A device according to claim 6, wherein said ridges have a maximum height of at least 0.3 μm with respect to the electrode surface of the associated substrate.

9. A ferroelectric liquid crystal device comprising:
a pair of substrates each having thereon a group of elongated electrodes and a ferroelectric liquid crystal disposed between the electrodes, the groups of elongated electrodes on the pair of substrates being disposed to cross each other; wherein
one substrate is provided with surface unevenness selectively at portions between the elongated electrodes, and the other substrate is provided with ridges at portions between the elongated electrodes, said ridges having a height with respect to the electrode surface which is less than a spacing between the substrates.

10. A device according to claim 9, wherein said surface unevennesses have a maximum difference in height of at least 0.1 μm.

11. A device according to claim 9, wherein said ridges have a maximum height of at least 0.3 μm with respect to the electrode surface of the associated substrate.

12. A ferroelectric liquid crystal display device, comprising:

a first substrate having thereon elongated transparent electrodes constituting data electrodes;
a second substrate having thereon elongated transparent electrodes constituting scanning electrodes; and
a ferroelectric liquid crystal disposed between the first and second substrates, wherein each of the first and second substrates has thin stripe electrodes formed of a transparent electrode material and having a width which is at most 1/10 of that of each elongated transparent electrode below the elongated transparent electrodes.

13. A display device according to claim 12, wherein each of the first and second substrates has been rubbed in one direction, and the thin stripe electrodes are disposed on each substrate in parallel with the rubbing direction of the substrate.

14. A display device according to claim 12, wherein each of the first and second substrates has been rubbed in one direction, and the thin electrodes are disposed on one substrate in parallel with the rubbing direction of said one substrate and disposed on the other substrate perpendicularly to the rubbing direction of said the other substrate.

15. A display device according to claim 12, wherein each of the first and second substrates has been rubbed in one direction, and the thin stripe electrodes are disposed on each substrate perpendicularly to the rubbing direction of the substrate.

16. A display device according to claim 12, wherein said ferroelectric liquid crystal is in a uniform alignment satisfying a relationship of $\Theta > \Theta a > \Theta/2$, wherein $\Theta$ denotes a cone angle, and $\Theta a$ denotes an apparent tilt angle, respectively, of the ferroelectric liquid crystal.

* * * * *

UNITED STATES PATENT AND TRADEMARK OFFICE
CERTIFICATE OF CORRECTION

PATENT NO. : 5,452,114
DATED : September 19, 1995
INVENTOR(S) : YOSHIO HOTTA ET AL.

It is certified that error appears in the above-identified patent and that said Letters Patent is hereby corrected as shown below:

TITLE PAGE:

AT [54] TITLE AND COL. 1, LINE 3

"ELECTRODE" should read --ELECTRODES--.

AT [57] ABSTRACT

Line 8, "minute" should read --a minute--.

SHEET 1 OF 13

FIG. 3, "VEROCITY" should read --VELOCITY--.

COLUMN 1

Line 3, "ELECTRODE" should read --ELECTRODES--.
Line 13, "device." should read --drive.--.
Line 21, "of H" should read --or H--.

COLUMN 2

Line 39, "6" should read --$\delta$--.

COLUMN 3

Line 52, "elevation" should read --elevations--.

COLUMN 4

Line 45, "vie" should read --views--.

UNITED STATES PATENT AND TRADEMARK OFFICE
CERTIFICATE OF CORRECTION

PATENT NO. : 5,452,114
DATED : September 19, 1995
INVENTOR(S) : YOSHIO HOTTA ET AL.

It is certified that error appears in the above-identified patent and that said Letters Patent is hereby corrected as shown below:

COLUMN 5

Line 68, "drawings." should read --the drawings.--.

COLUMN 7

Line 15, "suppress-" should read --suppress--.
Line 16, "ing" should be deleted.
Line 51, "othher" should read --other--.

COLUMN 8

Line 21, "stripes 81" should read --stripe electrodes 81--.
Line 28, "the" should be deleted.
Line 29, "very hardly n" should read --infrequently in--.
Line 62, "FIG. 12." should read --FIG. 10.--.
Line 66, "400-200 Å-thick" should read --400-2000 Å-thick--.

COLUMN 9

Line 10, "200-300 Å-thick" should read --200-3000 Å-thick--.
Line 13, "$102_b$." should read --102b.--.
Line 24, "substrates 101a" should read --substrate 101a--.
Line 35, "and," should read --acid,--.
Line 50, "height b" should read --height $\underline{h}$--.

UNITED STATES PATENT AND TRADEMARK OFFICE
CERTIFICATE OF CORRECTION

PATENT NO. : 5,452,114
DATED : September 19, 1995
INVENTOR(S) : YOSHIO HOTTA ET AL.

Page 3 of 4

It is certified that error appears in the above-identified patent and that said Letters Patent is hereby corrected as shown below:

COLUMN 10

Line 25, "an" should read --a--.

COLUMN 12

Line 3, "substrates 151a" should read --substrate 151a--.
Line 13, "and," should read --acid,--.
Line 57, "an" (second occurrence) should read --a--.

COLUMN 13

Line 10, "Example 6" should read --Example 3--.
Line 67, "a" should be deleted.

COLUMN 14

Line 18, "high" should read --height--.
Line 36, "electrodesk" should read --electrodes,--.
Line 38, "of:ps" should read --of:--.

UNITED STATES PATENT AND TRADEMARK OFFICE
CERTIFICATE OF CORRECTION

PATENT NO. : 5,452,114
DATED : September 19, 1995
INVENTOR(S) : YOSHIO HOTTA ET AL.

Page 4 of 4

It is certified that error appears in the above-identified patent and that said Letters Patent is hereby corrected as shown below:

COLUMN 16

Line 32, "wherein θ" should read --wherein 2θ--.

Signed and Sealed this

Twelfth Day of March, 1996

Attest:

BRUCE LEHMAN

Attesting Officer  Commissioner of Patents and Trademarks